Figure 1:
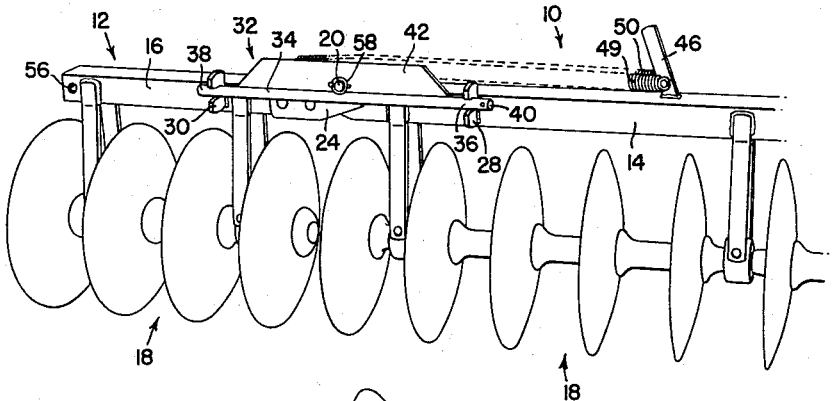

Jan. 21, 1964     W. P. OEHLER ETAL     3,118,507
GANG HOLDING MEANS FOR DISK HARROWS
Filed Dec. 20, 1961

INVENTORS.
WILLIAM P. OEHLER
CHARLES H. YOUNGBERG
BY

AGENT

United States Patent Office 3,118,507
Patented Jan. 21, 1964

3,118,507
GANG HOLDING MEANS FOR DISK HARROWS
William P. Oehler and Charles H. Youngberg, Moline, Ill., assignors to Deere & Company, Moline, Ill., a corporation of Delaware
Filed Dec. 20, 1961, Ser. No. 160,821
4 Claims. (Cl. 172—662)

The present invention relates generally to agricultural implements and more particularly to improvements in frames having a foldable portion which may be locked into its working position, and subsequently moved into its folded position with the aid of a lift assist.

In certain prior art devices with which applicant is familiar, certain disadvantages are present which the present invention overcomes. For example, in one harrow, the lift assist spring tends to lift the foldable section at all times with a considerable force, even when the foldable section is in its working position; the locking means is relatively complicated and easily subject to breakage; and no means are provided by which the operator can grasp the end of foldable section to lift the section while he is standing at a point remote from the section.

With respect to the first two disadvantages, if the lift assist tends to raise the foldable section with any appreciable force when it is in its working position the foldable section will not penetrate as deeply as non-foldable sections since a portion of its weight is supported by the non-foldable sections. Because it is desirable to have all parts penetrate to an equal depth, in a disk harrow for example, it is necessary to rigidly lock the foldable section into its working position. Since the weight of the foldable section is not sufficient to provide even penetration, the locking means must be of sufficient strength to keep the foldable section in its working position. If, however, the foldable section should strike an obstruction such as a rock the locking means may tend to break, especially if it has become fatigued during its use.

With respect to the third disadvantage set forth above, if the foldable end section should slip when it is being moved to either its folded position or to its working position, the operator may be severely injured by the disks or other tools carried by the frame.

Accordingly it is an object of the present invention to provide in a frame having a foldable section, lift assist means which exerts only a small moment of upward force to the foldable section when it is in its working position.

Another object of this invention is to provide locking means which is both strong and of simple construction.

Another object of this invention is to provide as a locking device, a removable member which can be used alternatively as a lock bar or as a lift handle. Another object of this invention is to provide a lift handle whereby the operator may stand at a safe distance from the implement while raising or lowering the same.

These and other objects and advantages of the present invention will be apparent to those skilled in the art after a consideration of the following detailed description, taken in conjunction with accompanying drawings. Right-hand and left-hand reference is determined by standing at the rear of the implement and facing the direction of travel.

In the drawings:

FIG. 1 is a perspective view of the outer end of the right hand gangs of the front section of a tandem disk harrow, incorporating the features of the present invention, the harrow being shown in its extended or working position.

Figure 3:
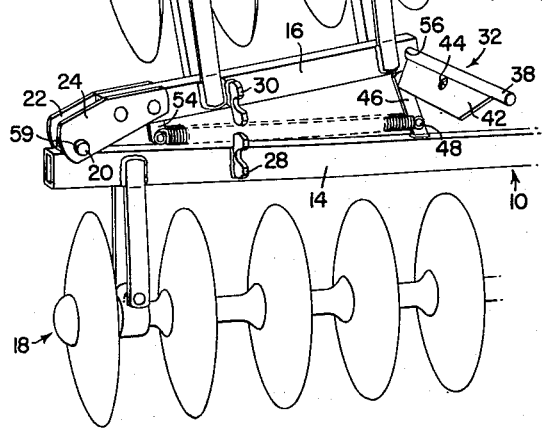
Figure 2:
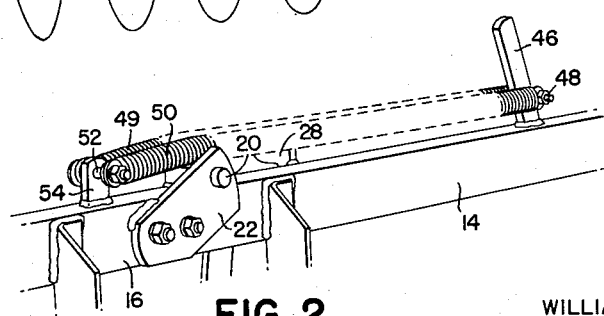

FIG. 2 is a perspective view of the frame and lift assist means of a tandem disk harrow similar to that of FIG. 1, taken from the rear of the left-front portion of a tandem disk harrow; and FIG. 3 is a perspective view, taken from the front of the right-rear portion of a tandem disk harrow incorporating the features of the present invention, the harrow being shown in its transport or folded position.

Referring to FIG. 1, the invention is shown applied to a farm implement in the form of a tandem disk harrow, of which only a portion has been illustrated. The harrow includes a central section 10 and an outrigger or foldable section 12. Each section has a main frame rail, indicated at 14 in the central section and at 16 in the outrigger or foldable section, from which disk gangs 18 are supported in a conventional manner.

Each outrigger or foldable section 12 is pivotally interconnected to the central section 10 by means of a hinge pin 20. The hinge pin is rigidly secured to the outer portion of the central section. Mounted on the inner portion of the foldable section are flanges 22, 24. These flanges extend upwardly and inwardly, and are provided at their inner ends with apertures which receive the ends of the hinge pin 20. As can be best seen from FIG. 3 the forward portion of the hinge pin 20 extends well beyond the flange 24.

Mounted along the forward sides of the main frame rails 14 and 16 are U-shaped brackets 28 and 30 respectively. A lock bar and lift handle 32 (FIG. 1) can be mounted between the legs of these two U-shaped brackets to lock the foldable section into its working position. The locking bar 32 includes a bar 34 which has two free ends 36 and 38 that, when the locking bar and lift handle is in its locking position, are inserted between the legs of the U-shaped brackets 28 and 30. One of the free ends is provided with a small aperture 40 (FIG. 1) for purposes which will be explained later. Rigidly secured to a central portion of the bar 34 between its two free ends is a brace plate 42 which is provided with an aperture 44 in a central portion. The brace plate 42 prevents bending of the bar 34 if there is a tendency of the outrigger section to swing upwardly about hinge pin 20 during operation.

Mounted on the top surface of the main frame rail 14 is a gang rest 46. This gang rest is provided with a transverse pin 48 (FIG. 2) which is adapted to receive the ends of the two lift assist springs 49 and 50. The other ends of the lift assist springs 49 and 50 are similarly secured to a transverse pin 52 on bracket 54 which is mounted on the top of the main frame rail 16. Holes 56 are provided in the sides of the outrigger section at its outer end.

The operation of applicants' device is as follows: Assuming the foldable section 12 is to be moved from its working position illustrated in FIG. 1 to its folded position illustrated in FIG. 3, the quick detachable pin 58 is removed from a small hole 59 in the end of the hinge pin 20. The locking bar and lift handle is then pulled towards the operator who is standing in front of the harrow to free the ends 36 and 38 from the brackets 28 and 30 and also to free the end of the hinge pin 20 from the aperture 44. The free end 36 of the locking bar and lift handle is then inserted through the holes 56 on the outrigger foldable section. The locking bar and lift handle is so dimensioned that the free end portion 36 will pass entirely through the main frame rail 16 exposing the small aperture 40 to one side of the rail. The quick detachable pin 58 is then inserted through the hole 40 to secure the locking bar and lift handle into its handle position. The operator then grasps the other end of the handle and raises the foldable section to its folded position.

To lower the foldable section to its working position and to lock it there all the operator need do is follow the reverse procedure of that set forth above, placing the ends 36 and 38 of the locking bar and lift handle between the legs of the bracket 28 and 30 after the outrigger section is in its working position with the hinge pin 29 passing through the aperture 44 in the brace plate. To lock the locking bar and lift handle into its locking position it is then only necessary to pass the quick detachable pin 58 through the small hole 59 at end of the hinge pin and to secure it into locking position.

By placing the gang rest 46 and bracket 54 at points on the frame rails 14 and 16 relatively remote from the hinge pin 20, and by also mounting the lift assist springs 49 and 50 close to and substantially parallel to the frame rails 14 and 16 virtually no lifting force is exerted by the springs on the outrigger 12 when the implement is in its working position. However if the outrigger section is raised off the ground, the lift assist springs will aid appreciably in further upward movement.

While there has been shown and described the preferred structure in which the principles of the present invention have been incorporated, it is to be understood that the present invention is not to be limited to the particular details, shown and described above, but that, in fact, widely different means may be employed in the practice of the broader aspects of this invention.

What is claimed is:

1. An agricultural implement comprising, a first section, a second section that is foldable relative to the first section from an extended working position to a folded transport position, a transversely disposed hinge pin pivotally interconnecting said first and second sections and having an end extending beyond one of the sides of said sections, U-shaped brackets rigidly secured along their bight portions to said side of the first and second sections, a bar having ends disposable between the legs of said U-shaped brackets, and an element secured to an intermediate portion of said bar and adapted to be disposed about said end of said hinge pin when the bar is in its locking position.

2. The invention set forth in claim 1 further characterized by fastening means removably secured to said end of the hinge pin and adapted to retain the element about said pin, said element comprising a longitudinally extending brace plate having an aperture therein, said end of said hinge pin being adapted to pass through said aperture.

3. The invention set forth in claim 1, further characterized by lift assist means interconnecting said first and second sections, the lift assist means comprising spring means disposed substantially parallel and closely adjacent to said first and second sections when they are in their extended working position whereby only a small amount of upward force is exerted on the second section.

4. The invention set forth in claim 1 in which at least one end of said bar is provided with a transversely disposed aperture, and said second section is provided with a hole at one end remote from the hinge pin, said hole being dimensioned to receive the apertured end of the bar, and said transversely disposed aperture being adapted to receive fastening means, whereby the bar may be removed from engagement with the first and second sections and have an apertured end inserted through the hole in the remote end, and fastened therein, the bar then serving as a lift handle.

References Cited in the file of this patent

UNITED STATES PATENTS

| | | |
|---|---|---|
| 206,490 | Schaumbury | July 30, 1878 |
| 649,093 | Wood | May 8, 1900 |
| 1,941,504 | White | Jan. 2, 1934 |
| 2,974,738 | Walberg | Mar. 14, 1961 |
| 3,028,928 | Juculano | Apr. 10, 1962 |